United States Patent
Yudanov

(10) Patent No.: US 12,404,956 B2
(45) Date of Patent: Sep. 2, 2025

(54) PIPE CONNECTION ARRANGEMENT FOR A FLUID MANAGEMENT SYSTEM

(71) Applicant: VOLVO TRUCK CORPORATION, Gothenburg (SE)

(72) Inventor: Sergi Yudanov, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 86 days.

(21) Appl. No.: 18/342,921

(22) Filed: Jun. 28, 2023

(65) Prior Publication Data

US 2024/0011584 A1    Jan. 11, 2024

(30) Foreign Application Priority Data

Jul. 8, 2022  (EP) .................................... 22183885

(51) Int. Cl.
| | | |
|---|---|---|
| F16L 19/00 | (2006.01) | |
| F02M 61/14 | (2006.01) | |
| F16L 19/065 | (2006.01) | |

(52) U.S. Cl.
CPC ......... F16L 19/0653 (2013.01); F02M 61/14 (2013.01); *F02M 2200/803* (2013.01)

(58) Field of Classification Search
CPC ................ F16L 19/0653; F02M 61/14; F02M 61/168; F02M 2200/803; F02M 55/02;
(Continued)

(56) References Cited

U.S. PATENT DOCUMENTS

| | | | | |
|---|---|---|---|---|
| 2,704,426 A | * | 3/1955 | Macaulay ............. | B24B 45/006 451/342 |
| 2,907,242 A | * | 10/1959 | Chakroff ............... | F16L 19/005 285/38 |
| 4,293,992 A | * | 10/1981 | Webb .................... | B25B 27/023 29/267 |

(Continued)

FOREIGN PATENT DOCUMENTS

| | | |
|---|---|---|
| EP | 1533091 A1 | 5/2005 |
| EP | 2821630 A1 | 1/2015 |
| WO | 2015127943 A1 | 9/2015 |

OTHER PUBLICATIONS

Extended European Search Report in corresponding European Application No. 22183885.7 dated Dec. 6, 2022 (5 pages).

*Primary Examiner* — Phutthiwat Wongwian
*Assistant Examiner* — Sherman D Manley
(74) *Attorney, Agent, or Firm* — Venable LLP; Jeffri A. Kaminski

(57) ABSTRACT

A pipe connection arrangement for a fluid management system includes a pipe nut for releasably connecting an end portion of a pipe to a fluid port of the fluid management system. The pipe nut has a first portion having a toothed outer profile and a second portion configured to engage with a connection point portion of said fluid management system. An elongated drive member having a first end portion with a toothed outer profile is configured to cooperate with the toothed outer profile of the pipe nut, the first end portion further being configured to concentrically engage with a supplementary guide member adapted to be fixedly arranged adjacent the connection point portion of said fluid management system. When the elongated drive member is in engagement with the supplementary guide member, and the second portion of the pipe nut is in engagement with the connection point portion, the toothed outer profile and the toothed outer profile of the pipe nut are permitted to mesh together such that a rotation of said elongated drive member (Continued)

causes a corresponding rotation of the pipe nut for clamping the end portion to the fluid port or unclamping the end portion from the fluid port.

16 Claims, 7 Drawing Sheets

(58) Field of Classification Search
CPC .............. F02M 37/0017; B25B 15/005; B25B 27/0035; B60T 17/043
See application file for complete search history.

(56) References Cited

U.S. PATENT DOCUMENTS

| | | | | |
|---|---|---|---|---|
| 4,850,153 | A * | 7/1989 | Husted | B27B 5/32 |
| | | | | 451/342 |
| 4,955,744 | A * | 9/1990 | Barth | B24B 45/006 |
| | | | | 411/408 |
| 5,934,853 | A * | 8/1999 | Junkers | B23P 19/067 |
| | | | | 411/917 |
| 6,035,506 | A * | 3/2000 | Bowen | B25B 27/023 |
| | | | | 29/259 |
| 6,676,168 | B2 * | 1/2004 | McAliley | F16L 41/14 |
| | | | | 285/139.2 |
| 8,245,723 | B2 * | 8/2012 | Mazzacano | F16L 29/002 |
| | | | | 251/315.1 |
| 10,480,470 | B2 * | 11/2019 | Graham | F02M 61/14 |
| 11,644,000 | B2 * | 5/2023 | Bazyn | F02M 61/14 |
| | | | | 123/470 |
| 2016/0223106 | A1 * | 8/2016 | Böttcher | F16L 51/00 |
| 2024/0246209 | A1 * | 7/2024 | Sellman | B25B 27/14 |

\* cited by examiner

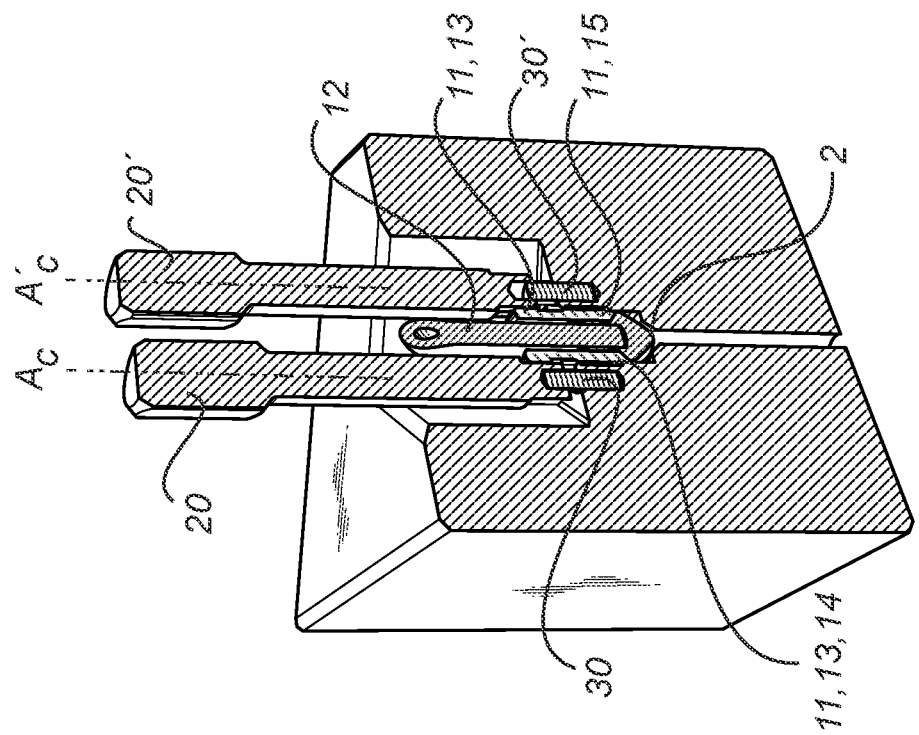
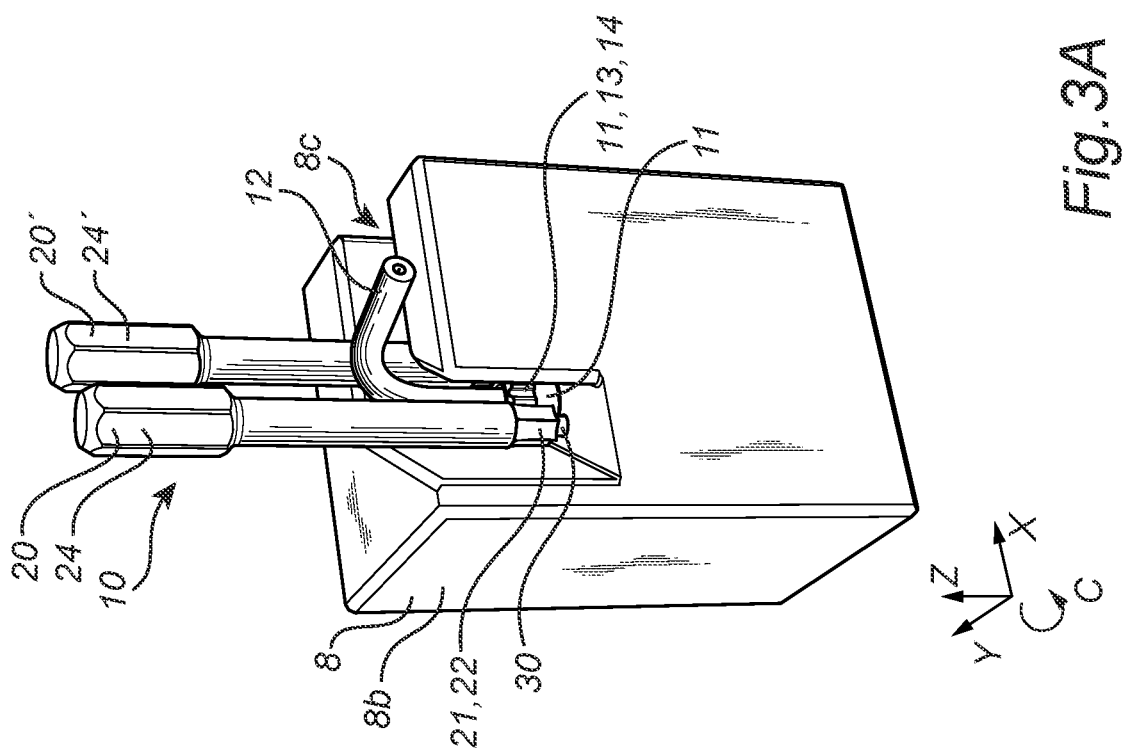

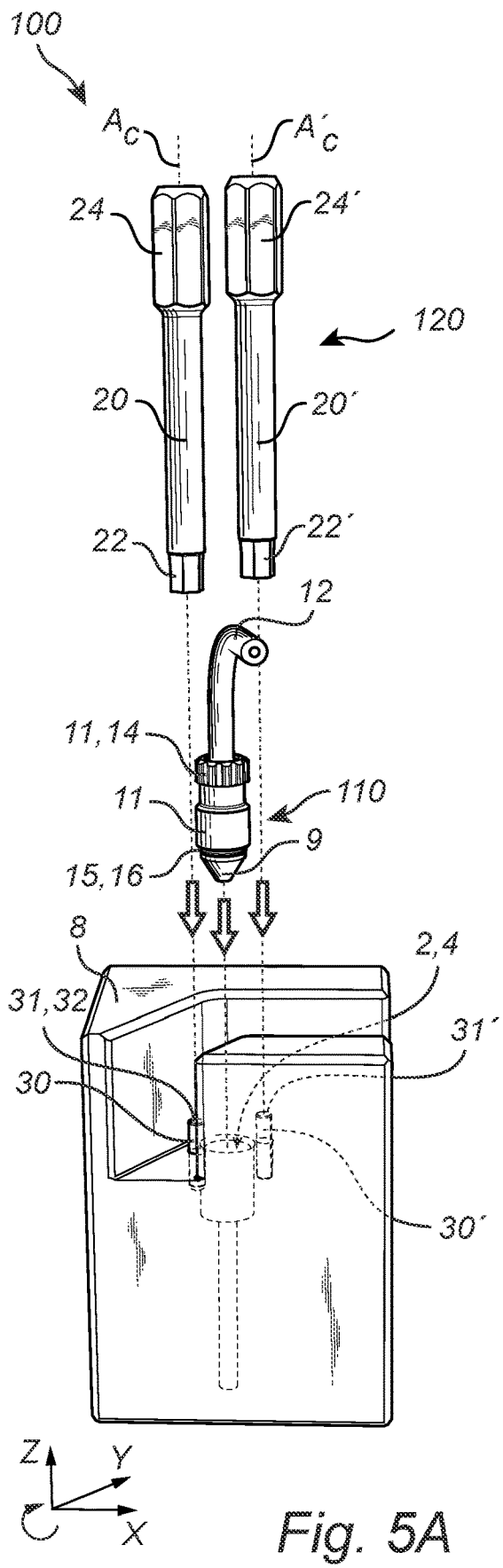
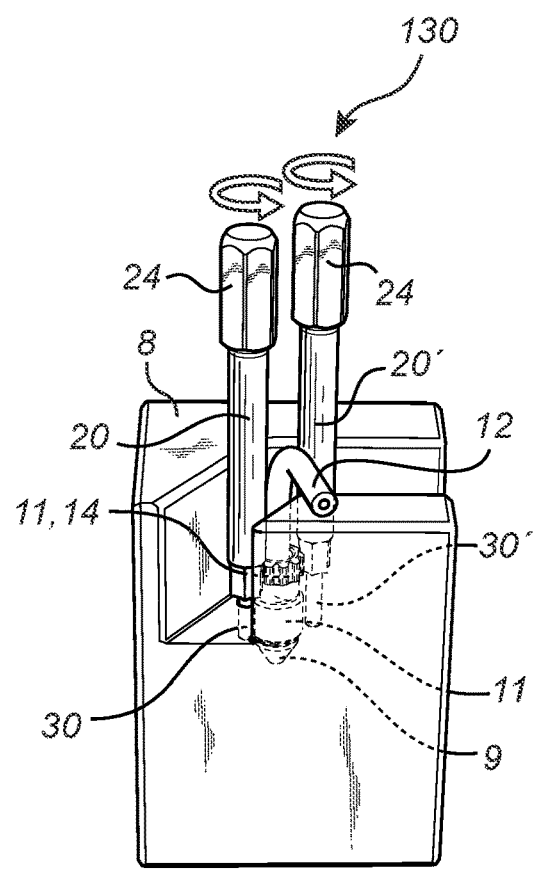
Fig. 5A
Fig. 5B

PIPE CONNECTION ARRANGEMENT FOR A FLUID MANAGEMENT SYSTEM

TECHNICAL FIELD

The present disclosure relates to a pipe connection arrangement for a fluid management system. In particular, the disclosure relates to a fuel pipe connection arrangement for a fuel management system of a vehicle, wherein the fuel management system comprises a fuel injector. The disclosure also relates to a fluid management system for a vehicle, in particular a fluid management system comprising a fuel injector. Moreover, the disclosure relates to a vehicle comprising such a pipe connection arrangement and/or fluid management system. The disclosure is applicable on vehicles, in particular heavy-duty vehicles, such as trucks, buses and construction equipment. Although the disclosure will be described in relation to a truck, the disclosure is not restricted to this particular type of vehicle, but may also be used in other types of vehicles such as cars, working machines within the fields of industrial construction machines or construction equipment, such as articulated haulers, dump trucks, wheel loaders and the like. The disclosure may also be used in other types of industrial machines, engines, marine vessel and applications.

BACKGROUND

In fluid management systems for vehicles, such as fuel systems for engines, there is a need for installing new components and performing service maintenance on a regular basis in order to ensure reliable and long-lasting operations. Such operations may generally include or involve installations of pipes, such as connecting or disconnecting one or more fuel pipes to one or more fuel injectors of a fuel management system.

One challenge during installation of pipes is the lack of space for any needed tightening tools when pipes are installed in spaces where there is limited sideways access to the pipe connection point. One example of such environment in a vehicle is the injector installation environment under a valve cover, or a rocker cover, and between the engine valve springs of an engine. Typically, the fuel pipes may need to be connected to the injector with their connection points positioned in between the springs with limited space around, where a pipe additionally forms a bend relatively close to its connection point thus preventing access for the tightening tool. Another example of such an installation may be a pneumatic variable valve actuation system, where complex assemblies are installed in a restricted space under the rocker cover.

There is thus a desire to provide an improved pipe connection arrangement for a fluid management system. In particular, there a desire to provide an improved pipe connection arrangement for a fluid management system of a vehicle.

SUMMARY

It is an object of the present disclosure to facilitate installation of a pipe to a fluid management system, such as fluid management system of a vehicle.

According to a first aspect of the present disclosure, there is provided a pipe connection arrangement for a fluid management system. The pipe connection arrangement comprises a pipe nut for releasably connecting an end portion of a pipe to a fluid port of the fluid management system. The pipe nut comprises a first portion having a toothed outer profile and a second portion configured to engage with a connection point portion of the fluid management system. The pipe connection arrangement further comprises an elongated drive member having a first end portion with a toothed outer profile. The toothed outer profile is configured to cooperate with the toothed outer profile of the pipe nut. The first end portion is further configured to concentrically engage with a supplementary guide member adapted to be fixedly arranged adjacent the connection point portion of the fluid management system. Hereby, when the elongated drive member is in engagement with the supplementary guide member, and the second portion of the pipe nut is in engagement with the connection point portion, the toothed outer profile and the toothed outer profile of the pipe nut are permitted to mesh together such that a rotation of the elongated drive member causes a corresponding rotation of the pipe nut for clamping the end portion to the fluid port or unclamping the end portion from the fluid port.

By providing a pipe nut for releasably connecting the end portion of a pipe to a fluid port of the fluid management system, the arrangement is configured to clamp and retain, in a fluid-sealing manner, the pipe to the fluid port of the fluid management system.

In this manner, the proposed pipe connection arrangement contributes to an improved functional interface between the pipe and the fluid management system. The present disclosure is based on the insight that generous space allowances are needed for the design of components with pipe connections making up a particular assembly unit, to ensure pipes can be installed and tightened/removed with acceptable difficulty. This usually involves providing the necessary minimum space for tightening tool access, causing the overall design to become relatively complex, bigger in size etc. Occasionally, the components of the assembly may be designed more compact at the cost of having to design and use special tools that can fit tighter spaces for pipe tightening in each particular installation. In other cases, special clamps may be utilized instead of the pipe nuts. This type of arrangement may allow for more compact designs, but generally at the expense of increasing the separate parts' count, introducing loose parts (screw, clamp) that could fall away and/or be forgotten inside the engine after assembly. Still, the use of a clamp may generally require an appropriate space and may also complicate the design of matching components.

Moreover, the proposed pipe connection arrangement provides for pipe-co-axial access of the pipe nut tightening tool, thus allowing for pipe installations of such configurations that may otherwise be difficult in e.g. a common engine environment of a heavy-duty vehicle because of the space constraints. The proposed pipe connection arrangement further allows for using standard tools, whilst reducing the need for using additional separate parts such as clamps and screws.

It should be noted that the fluid may refer to any type of gaseous and liquid fluid medium. By way of example, the fluid is a fuel. The fuel may be provided in gaseous phase or liquid phase. The fluid may also be a liquid such as oil for the engine, e.g. lubrication oil. However, the liquid may also be transmission oil, oil for lubricating a shaft, or a fluid in a cooling system, a working fluid in a braking system, a working fluid in a hydraulic power transmission and/or a working fluid in a control system etc.

While the pipe connection arrangement can be used for various types of fluid management systems so as to connect a pipe to a component of the fluid management system, the example embodiments of the disclosure are particularly useful for a fluid such as a fuel, e.g. hydrogen fuel. Hence, according to one example embodiment, the pipe connection arrangement is a pipe connection arrangement for connecting a hydrogen fuel pipe to a fluid management system in the form of an injector assembly of an engine, e.g. an internal combustion engine of a vehicle.

It should also be readily appreciated that the elongated drive member may only be a part of the pipe connection arrangement during installation and removal of the pipe connection. In this context, the elongated drive member may be considered as a complementary tool for connecting the pipe to the fluid management system.

Typically, when the pipe nut is in threaded engagement with a corresponding threaded part of the connection point portion, an axis of rotation of the pipe nut may essentially be parallel to the centre axis of the supplementary guide member.

The elongated drive member may generally be arranged and configured to engage with the toothed outer profile of the pipe nut.

The first end portion may comprise a recess arranged concentrically about a centre axis of the elongated drive member and further adapted to at least partly encompass an outer end part of the supplementary guide member. In this manner, the positioning of the elongated drive member relative to the pipe nut may be further improved.

The elongated drive member may comprise a cylindrical recess arranged concentric with the first end portion and extending from the end face of the first end portion. The cylindrical recess and the supplementary guide member may form a locational clearance fit upon concentrical engagement of the supplementary guide member and the elongated drive member.

In other examples, the supplementary guide member may be a segment formed by a cylindrical part having an internal diameter. The cylindrical part may be comprised in the fluid management system. The internal diameter of the cylindrical part may be configured such that upon the concentric engagement of the elongated drive member with the supplementary guide member, the internal diameter of the segment forms a locational clearance fit with a maximum diameter of the toothed outer profile.

Typically, when the first end portion of the elongated drive member is engaged with the supplementary guide member, the elongated drive member may be arranged adjacent the pipe nut and corresponding centre axis of the elongated drive member and the pipe nut, respectively, may be arranged parallel to each other. In this manner, the positioning of the elongated drive member relative to the pipe nut may be further improved. As such, the elongated drive member may generally be arranged adjacent the pipe nut as seen in a plane extending perpendicular to corresponding centre axis of the elongated drive member and the pipe nut.

The pipe connection arrangement may typically comprise the supplementary guide member. The supplementary guide member may be positioned at a distance from the connection point portion such that an axis of rotation of the pipe nut, when in engagement with the connection point portion, may be essentially parallel to a centre axis of the supplementary guide member. In this manner, the positioning of the elongated drive member relative to the pipe nut may be further improved. The distance may generally refer to a distance in the transverse direction and/or longitudinal direction.

The supplementary guide member may be arranged at a position adjacent the pipe connection point portion. As such, the supplementary guide member is associated with the fluid port.

By way of example, the supplementary guide member is a guide pin for arrangement in the fluid management system. The supplementary guide member may at least partly be of a cylindrical shape.

The pipe connection arrangement may further comprise an additional supplementary guide member. The additional supplementary guide member may be positioned at an essentially same transverse distance from the connection point portion as the supplementary guide member, but at different angular location around a circumference of the connection point portion relative to the angular location of the supplementary guide member. Hereby, it becomes possible to further improve the installation of the pipe to the fluid management system. Also, the above configuration with the additional supplementary guide member provides for improving the timing of the meshing cooperation between the toothed profiles.

The additional supplementary guide member may be essentially identical in design to the supplementary guide member.

The supplementary guide member may be a first supplementary guide member and the additional supplementary guide member may be a second supplementary guide member. The second supplementary guide member may be arranged asymmetrical from the position of the first supplementary guide member relative to the axis of rotation of the pipe nut.

The additional supplementary guide member may be positioned at an angular location that is not a multiple of 360 degrees divided by a number of teeth of the toothed outer profile. In this manner, it may be possible to use a less complex shaped pattern of the toothed profile that generally require more than one relative position of the driving and driven members for efficient enough force transfer.

The additional supplementary guide member may be positioned at an angle being greater than 120 degrees relative to the supplementary guide member. Such arrangement may at least partly overcome tilting of the pipe nut in its thread that increases friction in the threads and reduces useful torque.

The pipe connection arrangement may comprise an additional elongated drive member having a corresponding first end portion comprising a corresponding outer profile configured to mesh with the toothed outer profile upon engagement with and subsequent rotation of the additional elongated drive member. The corresponding first end portion may be configured to at least partly encompass a corresponding outer end part of the additional supplementary guide member.

The second portion may be an outer threaded profile of the pipe nut. Alternatively, the second portion may be an inner threaded profile of the pipe nut. If the second portion is provided in the form of an outer threaded profile, the second portion may be a part of the outer surface of the pipe nut and arranged space-apart from the toothed outer profile of the first portion.

The toothed outer profile of the elongated drive member may define a six-point star-shaped pattern, such as a TORX-profile. The toothed profile of the elongated drive member may define a standard TORX-profile and the diameter of the cylindrical recess may essentially be equal to a diameter of a central recess of a "Security TORX" screwdriver bit.

The pipe connection arrangement may generally also comprise the pipe. By way of example, the pipe nut may be arranged about a part of the pipe.

According to a second aspect of the present disclosure, there is provided a fluid management system. The fluid management system comprises a pipe connection arrangement according to the first aspect of the disclosure.

Effects and features of the second aspect are largely analogous to those described above in relation to the first aspect.

The supplementary guide member may be a separate part attached to the fluid management system.

The supplementary guide member may be comprised with the fluid management system. The supplementary guide member may be provided in the form of a cylindrical projecting segment. Alternatively, the supplementary guide member may be provided in the form of a cylindrical recessed segment with an inner diameter.

The supplementary guide member may be a cylindrical projecting segment being machined in the fluid management system. The supplementary guide member may be a cylindrical recessed segment being machined in the fluid management system.

The fluid management system may comprise a fuel injector assembly for an internal combustion engine. The fuel injector assembly may be a hydrogen fuel injector assembly configured to inject hydrogen fuel into a combustion chamber of the internal combustion engine. By way of example, the fluid management system may comprise a housing, wherein a pipe is connected to a connection point portion by means of the pipe connection arrangement. In addition, the fuel injector assembly is accommodated in the housing, wherein a fluid port of an injector is arranged in fluid communication with the connection point portion.

In one example, the fluid management system may comprise a housing for accommodating an injector of the fuel injector assembly, and the pipe connection arrangement may be configured to connect the pipe to the connection point portion, whereby the fluid port of the injector may be arranged in fluid communication with the connection point portion.

According to a third aspect of the present disclosure, there is provided a vehicle comprising a fluid management system according to any one of the example embodiments described in relation to the second aspect and/or a pipe connection arrangement according to any one of the example embodiments described in relation to the first aspect. The vehicle may be a truck, such as a heavy-duty truck. However, the disclosure is not limited to trucks and heavy-duty trucks. Rather, the vehicle may be any type of vehicle, such as a truck, car, working machine intended for carrying out an operation etc.

Effects and features of the third aspect are largely analogous to those described above in relation to the first aspect and/or the second aspect.

The fluid management system may be an integral part of an internal combustion engine. Alternatively, the fluid management system may be a separate part connected to the internal combustion engine.

Further features of, and advantages with, the present disclosure will become apparent when studying the appended claims and the following description. The skilled person will realize that different features of the present disclosure may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein:

FIGS. 3A to 3C schematically illustrate an example embodiment of the fluid management system and the pipe connection arrangement according to the present disclosure;

FIGS. 5A and 5B schematically illustrate a sequence of connecting a pipe to a fluid management system by means of the pipe connection arrangement in FIGS. 3A to 3C.

DETAILED DESCRIPTION OF EXAMPLE EMBODIMENTS OF THE DISCLOSURE

Figure 1:
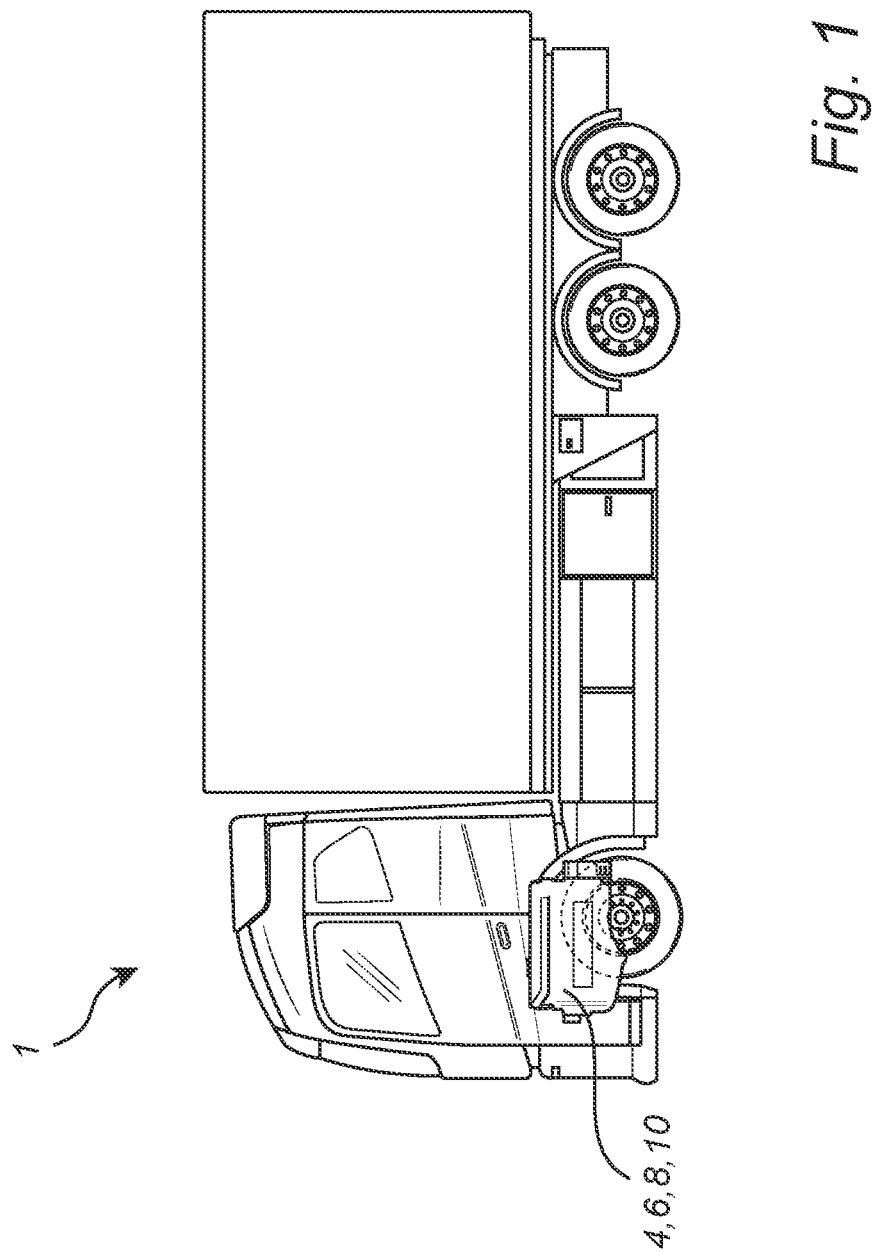
FIG. 1 is a lateral side view illustrating an example of a vehicle in the form of a truck; the vehicle comprising an internal combustion engine system having a fluid management system and a pipe connection arrangement according to one example embodiment of the present disclosure.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 in the form of a truck. The vehicle comprises an internal combustion engine system 4 having an internal combustion engine 6, such as a diesel engine. Further, the engine or engine system comprises a fluid management system 8 according to any one of the example embodiments of the present disclosure. The fluid management system 8 comprises a pipe connection arrangement 10 according to any one of the example embodiments of the present disclosure. In the following FIGS. 2, 3A to 3D, 4A to 4B and 5A to 5B, some examples of the pipe connection arrangement 10 will be described in greater detail.

Figure 2:
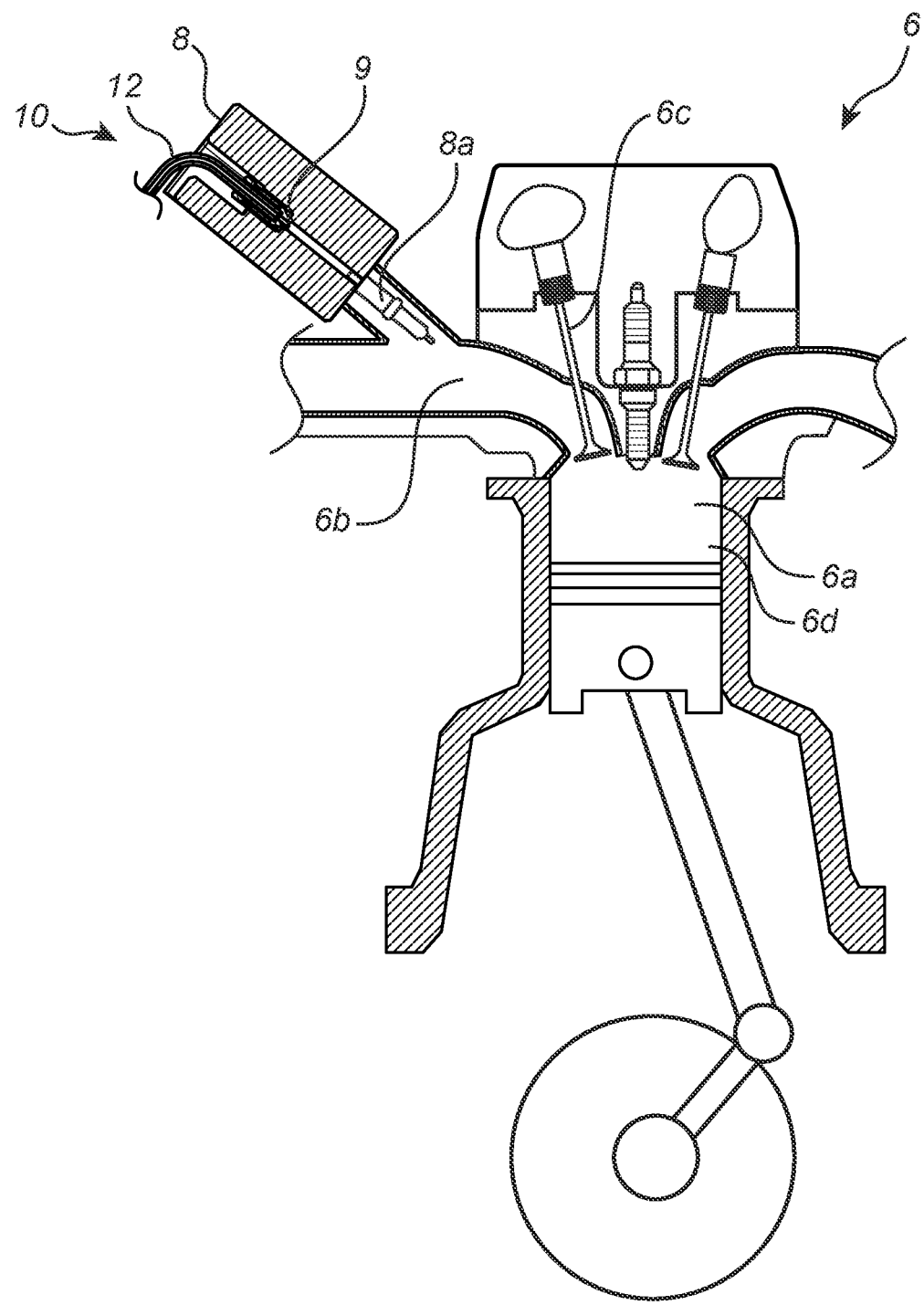
FIG. 2 schematically illustrates parts of the engine in FIG. 1 comprising an example embodiment of a fluid management system and a pipe connection arrangement according to the present disclosure.

FIG. 2 schematically illustrates an example embodiment of parts of the fluid management system 8 installed to the internal combustion engine 6 in FIG. 1. The internal combustion engine 6 comprises one or more cylinders 6a and an intake manifold 6b in fluid communication with the cylinder. The internal combustion engine 6 further comprises an intake valve 6c arranged in the intake manifold for regulating the flow of compressed air to a combustion chamber 6d of the internal combustion engine 6.

As illustrated in FIG. 2, the fluid management system 8 here comprises an injector 8a. Hence, the fluid management system 8 is here provided in the form of an injector assembly comprising the injector 8a. The injector 8a is configured to inject a fuel for combustion in the combustion chamber 6a. Thus, the injector 8a is a fuel injector. In FIG. 2, the fluid management system 8 is a so called port-injector fluid management system. In such system, the injector 8a is arranged to inject fuel into the intake manifold 6b upstream the intake valve 6b. Other arrangements of the injector 8a are also conceivable. For instance, the injector may be arranged in a cylinder head of the cylinder, through which fuel is injected into the cylinder 6a as a fuel spray.

The fuel is here petrol fuel. In other examples, the fuel is hydrogen fuel. In yet other examples, the fuel may be diesel fuel. For diesel ICE systems, the fuel is preferably injected with a pressure in the range 600 to 3000 bar. Generally, for an engine system using EGR, about 1000 to 2500 bar may be preferred, without EGR about 800 to 1400 bar. For hydrogen ICE systems, the hydrogen gas fuel may be injected with a low injection pressure of between 15 to 60 bar into the combustion chamber 6d and towards the piston. However, for other gaseous ICE systems, the fuel injector may be controllable to inject gaseous fuel into the combustion chamber with an injection pressure of up to about 500 bar. As such, there is a need for connecting the fuel pipe 12 to the injector 8a in a secure manner.

By way of example, the fuel injector 8a is connected and in fluid communication with a fuel tank (not illustrated). The number of fuel injectors may be equal to the numbers of cylinders of the ICE. The fuel injectors are each arranged in fluid communication with the fuel tank. Each one of the fuel injectors is connected to the fuel tank by a corresponding pipe 12, as illustrated in FIG. 2. In addition, as depicted in FIG. 2, the pipe 12 is connected to the fluid management system 8, depicted as an injector assembly, by means of a pipe connection arrangement 10. In FIG. 2, the pipe connection arrangement 10 is configured to releasably connect an end portion 9 of the pipe 12 to a fluid port of the fluid management system 8, i.e. the injector assembly. The fluid port may either be an integral part of the injector 8a or a fluid port of the injector assembly that is in fluid communication with the injector 8a.

Figure 3C:
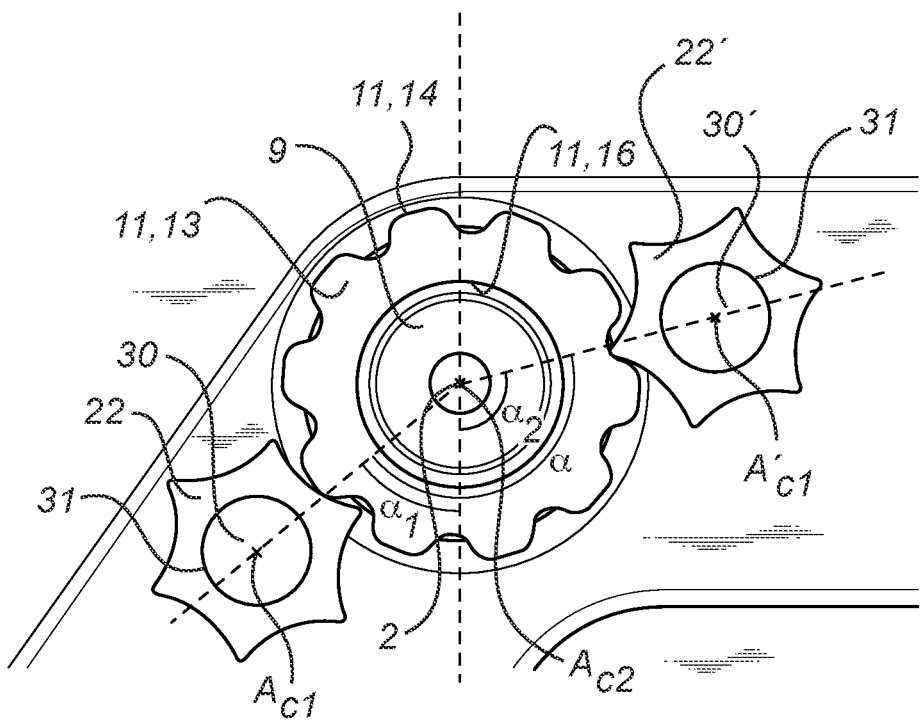
Figure 3D:
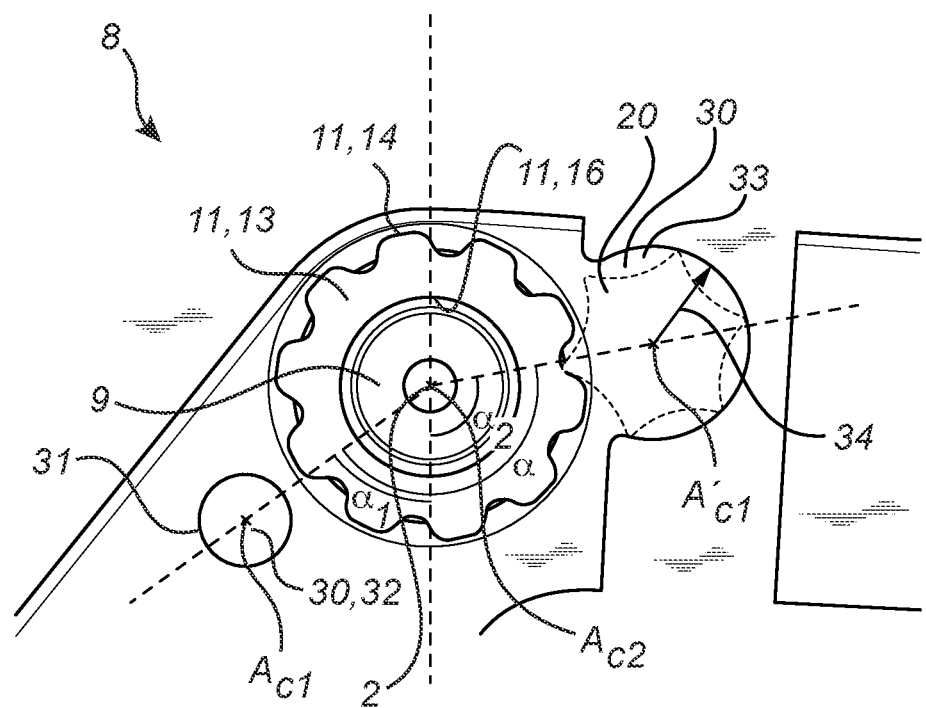
FIG. 3D schematically illustrate another example embodiment of the fluid management system and the pipe connection arrangement according to the present disclosure.

The parts of the fluid management system 8 as well as the pipe connection arrangement will now be described in more detail in relation to the FIGS. 3A to 3C, 4A to 4B and 5A to 5B. FIG. 3D is another example of a pipe connection arrangement 10 and a fluid management system 8 for use in the vehicle in FIG. 1.

The fluid management system 8 and the pipe connection arrangement 10 will be described in an orientation to the ICE 6, as illustrated in e.g. FIGS. 3A to 3C. However, the orientation of the fluid management system 8 and the pipe connection arrangement 10 as depicted in e.g. FIG. 3A is merely used as an example for ease of understanding the attachment of the pipe 12 to the fluid management system 8, and other attachment arrangements and orientations of the fluid management system 8 and the pipe connection arrangement 10 may be conceivable. As indicated in e.g. FIG. 3A, the fluid management system 8 has an extension in a longitudinal direction X, an extension in a transverse direction Y and an extension in a vertical direction Z. Analogously, the components of the pipe connection arrangement 10 have an extension in a longitudinal direction X, an extension in a transverse direction Y and an extension in a vertical direction Z. Some of the components may also have a circular cross-section and a cylindrical shape. These types of components may also be defined as having an extension in an axial direction A, an extension in a radial direction R and an extension in a circumferential direction C. Generally, as illustrated in e.g. FIG. 3A, when the pipe 12 is connected to the fluid management system 8 by the pipe connection arrangement 10, the direction Z corresponds to the axial direction A, as will be further described herein in relation to the components making up the pipe connection arrangement 10.

Turning now to FIGS. 3A to 3C, there is depicted one example embodiment of the pipe connection arrangement 10 for the fluid management system 8 in FIG. 2. FIG. 3A is a perspective view of the pipe connection arrangement 10 and the fluid management system 8, in which the pipe 12 is connected to the fluid management system 8 by means of the pipe connection arrangement 10. FIG. 3B is a cross-sectional view of the pipe connection arrangement 10 and the fluid management system 8, as seen in a cross-sectional plane extending in the longitudinal direction X and the vertical direction Z. In FIG. 3B, the pipe 12 is connected to the fluid management system 8 by means of the pipe connection arrangement 10. FIG. 3C is another cross-sectional view of the pipe connection arrangement 10 and the fluid management system 8, as seen in a cross-sectional plane extending in the longitudinal direction X and the transverse direction Y, and in which the pipe 12 is connected to the fluid management system 8 by means of the pipe connection arrangement 10.

As illustrated in FIGS. 3A to 3C, the fluid management system 8 comprises a housing 8b for the injector 8a. In addition, the housing 8b comprises an outer recess 8c for the pipe 12. The outer recess 8c defines a restricted space for any tools needed for connecting and disconnecting the pipe 12 to the housing 8b.

Figure 4A:
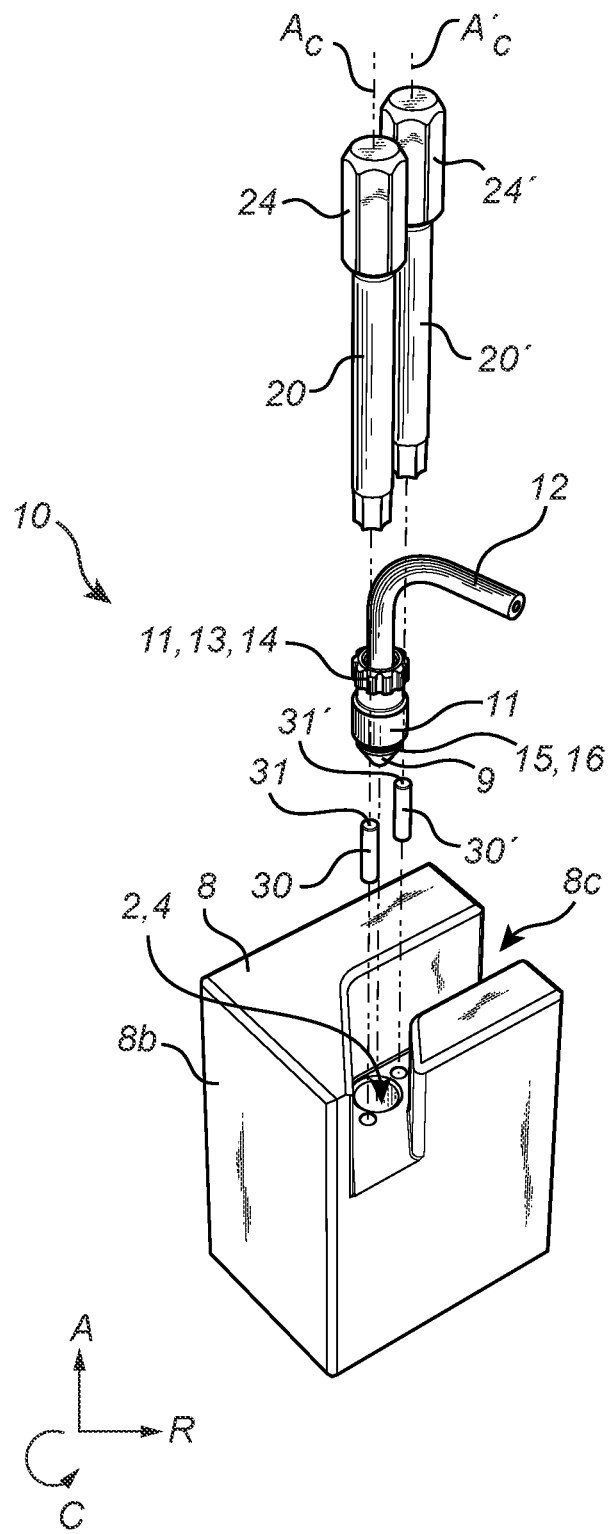
FIG. 4A is an exploded perspective view of the fluid management system and the pipe connection arrangement in FIGS. 3A to 3C.

The fluid management system 8 comprises the pipe connection arrangement for connecting the pipe 12 to the fluid port 2, as illustrated e.g. in FIG. 3B. One example of the pipe connection arrangement will now be described with reference to FIGS. 3A to 3C in conjunction with FIG. 4A. FIG. 4A is an exploded perspective view of the fluid management system 8 and the pipe connection arrangement 10 in FIGS. 3A to 3C.

As illustrated in e.g. FIG. 3C in combination with FIG. 4A, the pipe connection arrangement 10 comprises a pipe nut 11. The pipe nut 11 has a first portion 13, which is here provided as a head portion. The first portion 13 defines an outer side and an inner side. The first portion 13 is thus generally provided in the form of a ring-shaped portion, resembling a conventional screw nut. As illustrated in e.g. FIG. 3C, the first portion 13 comprises a toothed outer profile 14. The toothed outer profile 14 may be considered as a first outer profile 14 of the pipe nut 11.

The pipe nut 11 defines an inner hole for receiving the end portion 9 of the pipe 12. In this example, the pipe nut 11 is arranged about the pipe 12. The pipe nut 11 is arranged around the pipe 12 such that the end portion 9 of the pipe 12 is located outside the pipe nut 11. That is, the pipe nut 11 is arranged circumferentially around the pipe 12, whilst the end portion 9 of the pipe 12 projects away from the pipe nut 11 in the axial direction A of the pipe 12, here also corresponding to the vertical direction Z.

The pipe nut 11 also comprises a second portion 15. The second portion 15 is configured to engage with the connection point portion 4 of the fluid management system 8. The connection point portion 4 is here in fluid communication with the fluid port 2 of the injector 8a. As such, the second portion 15 is configured to indirectly connect with the fluid port 2 of the injector 8a of the fluid management system 8 so as to provide a fluid connection therebetween. In this example, the second portion 15 comprises an outer threaded profile 16, as depicted in FIG. 4A. The outer threaded profile 16 may be considered as a second outer profile of the pipe nut 11. The second portion 15 thus comprises the second outer profile of the pipe nut 11. In other examples, although not illustrated, the second portion may be an inner threaded of the pipe nut. The second portion may in addition, or alternatively, be a bayonet connection portion. In such example, the connection point portion 4 generally comprises a corresponding bayonet connection portion.

By way of example, the outer threaded profile 16 is a conventional thread, also commonly denoted as a screw thread. The screw thread is defined as a ridge of uniform section in the form of a helix on the surface of the pipe nut 11. The connection point portion 4 generally comprises a corresponding threaded portion (not illustrated) configured to engage with the outer threaded profile 16.

To this end, by the first portion 13 and the second portion 15, the pipe nut 11 is configured to releasably connect the end portion 9 of the pipe 12 to the connection point portion 4 of the fluid management system 8, and thus to connect the pipe 12 in fluid communication with the fluid port 2 of the injector 8a. By this connection configuration, the arrangement of the pipe nut 11 is configured to clamp and retain, in a fluid-sealing manner, the pipe 12 to the connection point portion 4 of the fluid management system 8. In other examples, the pipe nut 11 is configured to releasably connect the end portion 9 of the pipe 12 directly to a connection point portion 4 in the form of the fluid port 2 of the injector 8a. The connection point portion is here an integral part of the injector. However, the connection point portion may in other examples be an additional part and/or a separate part from the injector. Hence, the connection point portion 4 may be an interconnecting portion arranged to interconnect the pipe 12 with the injector 8a.

Figure 4B:
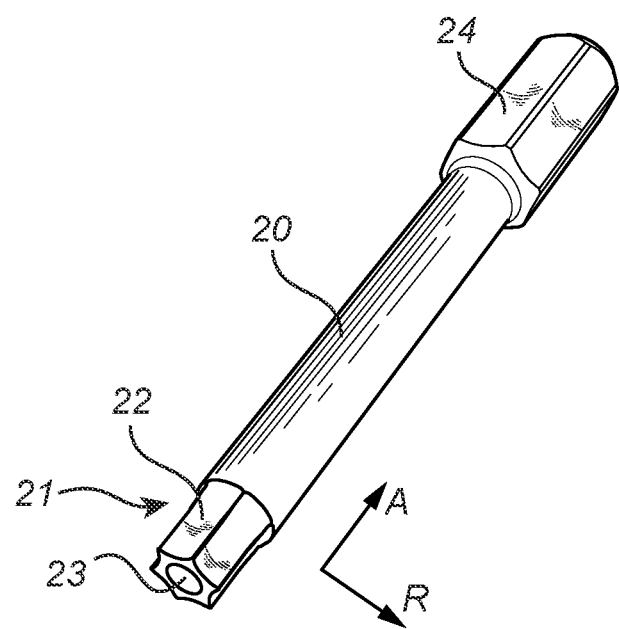
FIG. 4B schematically illustrates one component of the pipe connection arrangement in FIGS. 3A to 3C.

Moreover, as illustrated in e.g. FIG. 4A, the pipe connection arrangement 10 here comprises an elongated drive member 20. The elongated drive member 20 is a tool component used at the times of assembly and disassembly of the pipe 12 to the fluid management system 8, but generally not during transportation of fluid through the pipe 12 to the fluid management system 8. The elongated drive member 20 extends in the axial direction A and in the radial direction R. The elongated drive member 20 further has a centre axis Ac, extending in the axial direction A. The axial direction is parallel to the vertical direction Z. The centre axis Ac of the elongated drive member 20 here corresponds to the axis of rotation of the elongated drive member 20. FIG. 4B illustrates further parts of the elongated drive member 20 in FIG. 4A. As illustrated in FIG. 4B, the elongated drive member 20 has an essentially cylindrical shape with a substantial length in the axial direction A.

The elongated drive member 20 comprises a first end portion 21. The first end portion 21 comprises a toothed outer profile 22. The toothed outer profile 22 is configured to cooperate with the toothed outer profile 14 of the pipe nut 11. In addition, the toothed outer profile 22 and the toothed outer profile 14 are complementary in shape so as to provide for a functional interaction therebetween upon rotation of the elongated drive member 20, as illustrated in the FIGS. 5A and 5B.

In this example, the toothed outer profile 22 of the elongated drive member 20 has a six-point star-shaped pattern. The six-point star-shaped pattern is here provided in the form of a TORX-profile. Accordingly, the toothed outer profile 22 is configured to cooperate with the toothed outer profile 14 of the pipe nut 11.

As such, the elongated drive member 20 is arranged and configured to engage with the toothed outer profile 14 of the pipe nut 11, as also depicted in e.g. FIG. 3C.

As illustrated in FIG. 4B, the elongated drive member 20 comprises a second end portion 24. The second end portion 24 is arranged at an opposite axial end of the elongated drive member 20. That is, the first and seconds end portions 21, 24 are opposite axial end portions of the elongated drive member 20. The second end portion 24 is a head portion of the elongated drive member 20. The second end portion 24 is adapted to cooperate with a tool, such as a wrench, a screwdriver or the like. By way of example, the second end portion 24 is a hexagon head portion. Other designs of the second end portion may also be conceivable as long as the elongated drive member 20 can be manipulated by a tool. The second end portion 24 and the first end portion 22 may also be distanced from each other by means of an intermediate cylindrical part extending in the axial direction and between the first and second end portions 22, 24.

Further, the pipe connection arrangement 10 comprises a supplementary guide member 30, as illustrated in FIGS. 3A to 3C, and also in FIG. 4A. The supplementary guide member 30 has a corresponding centre axis Ac1. The supplementary guide member 30 can be provided in several different shapes and configurations. In this example, the supplementary guide member 30 is a guide pin. Moreover, the supplementary guide member 30 is adapted for arrangement in the fluid management system 8 at a position adjacent the pipe connection point portion 4. Thus, the supplementary guide member 30 is associated with the fluid port 2. The supplementary guide member 30 comprises an outer end part 31. As illustrated in e.g. FIG. 4A, the outer end part 31 defines a cylindrical shaped portion. Accordingly, the supplementary guide member 30 is here at least partly of a cylindrical shape. Thus, the supplementary guide member 30 has a circular cross section and a substantial extension in the axial direction A. However, the supplementary guide member may also be provided in other designs, e.g. with a rectangular cross section and a substantial length in the axial direction A.

In FIGS. 3A to 3C, the supplementary guide member 30 is a separate part attached to the fluid management system 8. As such, the supplementary guide member 30 is adapted to be fixedly arranged adjacent the connection point portion 4 of the fluid management system 8. In other examples, the supplementary guide member 30 is an integral part of the fluid management system 8.

By way of example, the supplementary guide member 30 is a cylindrical projecting segment 32, as illustrated in FIGS. 3A to 3C. In other examples, the supplementary guide member 30 may be a cylindrical recessed segment 33, as illustrated in FIG. 3D. In FIG. 3D, the supplementary guide member 30 is provided in the form of a cylindrical recessed segment 33 with an inner diameter 34. The cylindrical projecting segment and/or cylindrical recessed segment may be machined in the fluid management system 8.

The elongated drive member 20 and the supplementary guide member 30 are arranged and configured to engage with each other. By way of example, the first end portion 21 is configured to concentrically engage with the supplementary guide member 30. By way of example, as depicted in FIG. 4B, the first end portion 21 comprises a recess 23. The recess 23 is arranged concentrically about the centre axis Ac of the elongated driver member 20. The recess 23 is further adapted to at least partly encompass the outer end part 31 of the supplementary guide member 30.

As depicted in FIG. 4B, the recess 23 is a cylindrical recess. The cylindrical recess 23 is arranged concentric with the first end portion 21. In addition, the cylindrical recess 23 extends from an end face of the first end portion 21.

Furthermore, a diameter of the cylindrical recess 23 is here essentially equal to a diameter of a central recess of a so called Security TORX® screwdriver bit of the appropriate standard size. Security TORX®, or tamper proof TORX screwdriver bits have the exact same exterior shape as regular TORX® screwdriver bits, but have a small hole drilled in the end to accept the shape and geometry of the supplementary guide member 30. However, other shapes and diameters may be selected for other types of elongated drive members.

It is to be noted that the supplementary guide member 30 may be designed with a tolerance relative the cylindrical recess 23. Hence, in FIGS. 3A to 3C, the cylindrical recess 23 and the supplementary guide member 30 form a locational clearance fit upon concentrical engagement of the supplementary guide member 30 and the elongated drive member 20.

As mentioned above, FIG. 3D schematically illustrates another example of the design of the supplementary guide member 30. In this example, the supplementary guide member is a recessed segment 33 formed by a cylindrical part having an internal diameter 34. The cylindrical recessed segment 33 is here a part of the fluid management system 8. Hence, the fluid management system 8 comprises the cylindrical recessed segment 33 having the internal diameter 34 (rather than the projecting segment as illustrated in FIG. 3C). As illustrated in FIG. 3D, the size of the internal diameter 34 of the cylindrical recessed segment 33 is set such that upon the concentric engagement of the elongated drive member 20 with the supplementary guide member 30, the internal diameter 34 of the cylindrical recessed segment 33 forms a locational clearance fit with a maximum diameter of the toothed outer profile 22. Unless explicitly mentioned herein, the example in FIG. 3D can include any other feature, example and/or aspect as mentioned herein with respect to FIGS. 1, 2, 3A to 3C, 4A to 4B and 5A to 5B.

As illustrated in FIG. 3B in conjunction with FIG. 3C, the supplementary guide member 30 is positioned at a distance from the connection point portion 4. By way of example, the supplementary guide member 30 is positioned at a transverse distance from the connection point portion 4. The supplementary guide member 30 may in addition be positioned at a longitudinal distance from the connection point portion 4. Further, the supplementary guide member 30 may be positioned at a distance from the connection point portion 4 as seen in the transverse and longitudinal directions.

Turning again to the pipe nut 11 and FIG. 3C, the pipe nut 11 has a centre axis Ac2. The centre axis Ac2 of the pipe nut 11 here corresponds to the axis of rotation of the pipe nut 11. Thus, the pipe nut 11 has an axis of rotation, Ac2. As illustrated in FIG. 3C, when the pipe nut 11 is in threaded engagement with the thread of the connection point portion 4, the axis of rotation Ac2 of the pipe nut 11 is essentially parallel to the centre axis Ac1 of the supplementary guide member 30, i.e. to the cylindrical part of the supplementary guide member 30.

As further illustrated in FIG. 3C, when the elongated drive member 20 is in engagement with the supplementary guide member 30, and the second portion 15 of the pipe nut 11 is in engagement with the connection point portion 4, the toothed outer profile 22 and the toothed outer profile 14 of the pipe nut 11 are permitted to mesh together. In this manner, a rotation of the elongated drive member 20 causes a corresponding rotation of the pipe nut 11 for clamping the end portion 9 to the fluid port 2 or unclamping the end portion 9 from the fluid port 2.

By the above arrangement, it thus becomes possible to effect a connection of the pipe 12 to the connection point portion 4 by manipulating the elongated drive member 20 and the pipe nut 11.

More specifically, when the toothed outer profile 22 of the elongated drive member 20 is engaged with the toothed outer profile 14 of the pipe nut 11, a rotation of the elongated drive member 20 about its centre axis Ac causes the toothed outer profile 22 of the elongated drive member 20 to effect a corresponding rotation of the pipe nut 11 about its centre axis Ac2, thereby effecting a tightening or loosening of the pipe 12 relative to the pipe connection point portion 4. In this example, as illustrated in FIG. 4A, the pipe connection point portion 4 is arranged on the housing 8b of the injector assembly (fluid management system 8), whilst the fluid port 2 is arranged on the injector 8a. The fluid port 2 is in fluid communication with the connection point portion 4. In other examples, the fluid port 2 corresponds to the pipe connection point portion 4.

As mentioned above, and illustrated in e.g. FIG. 3C, the supplementary guide member 30 is arranged adjacent the pipe nut 11. In addition, the corresponding centre axis Ac of the elongated drive member 20 and the centre axis of the Ac2 of the pipe nut 11 are here arranged parallel to each other. In other words, the corresponding centre axis Ac of the elongated drive member 20 and the centre axis of the Ac2 of the pipe nut 11 are on the same plane. Thus, the corresponding centre axis Ac of the elongated drive member 20 and the centre axis of the Ac2 of the pipe nut 11 are arranged adjacent each other as seen in a plane extending perpendicular to the corresponding centre axis Ac1 of the supplementary guide member 30 and the axis of rotation (centre axis) Ac2 of the pipe nut 11. Moreover, when the first end portion 21 of the elongated drive member 20 is engaged with the supplementary guide member 30, the elongated drive member 20 is arranged adjacent the pipe nut 11 as seen in a plane extending perpendicular to the corresponding centre axis Ac of the elongated drive member 20 and the axis of rotation Ac2 of the pipe nut 11.

Typically, although strictly not required, the pipe connection arrangement 10 comprises an additional supplementary guide member 30' and an additional elongated drive member 20', as illustrated in FIGS. 3A to 3C and FIGS. 4A to 4B. In other words, the pipe connection arrangement 10 comprises the additional supplementary guide member 30'. The additional supplementary guide member 30' is here essentially identical in design to the supplementary guide member 30. Thus, the supplementary guide member 30 is a first supplementary guide member 30 and the additional supplementary guide member 30' is a second supplementary guide member.

As illustrated in FIG. 3C, the additional supplementary guide member 30' is arranged asymmetrical from the position of the first supplementary guide member 30 relative to the axis of rotation Ac2 of the pipe nut 11.

In addition, as illustrated in FIG. 3C, the additional supplementary guide member 30' is positioned at an essentially same transverse, or lateral, distance from the connection point portion 4 as the first supplementary guide member 30, but at different angular location around a circumference of the connection point portion 4 relative to the angular location of the first supplementary guide member 30.

By way of example, as illustrated in FIG. 3C, the additional supplementary guide member 30' is positioned at an angle alfa α being greater than 120 degrees relative to the supplementary guide member 30. As illustrated in FIG. 3C, the angle alfa α is the sum of the α1 and α2. Such arrangement may at least partly overcome tilting of the pipe nut in its thread that increases friction in the threads and reduces useful torque. In practice, one supplementary guide member 30 may generally be used for initial tightening and then the additional supplementary guide member 30' for additional tightening. Positioning the additional supplementary guide member 30' more towards the opposite side of the pipe nut 11 may help to counter the tilt introduced when using the supplementary guide member 30.

In addition, or alternatively, the additional supplementary guide member 30' is positioned at an angular location that is not a multiple of 360 degrees divided by the number of teeth of the toothed outer profile 14. Such arrangement allows for using a less complex shaped pattern of the toothed profile that generally require more than one relative position of the elongated drive member 20 and the pipe nut 11 for efficient enough force transfer. In practice, the elongated drive member 20 may occasionally slip relative to the pipe nut 11 once a particular angular position of the pipe nut 11 is reached. In such cases, the elongated drive member 20 is moved to the other supplementary guide member 30 (to continue tightening the pipe nut) where the supplementary guide member 30 may not slip.

In some designs, as illustrated in FIGS. 3A to 3C and FIGS. 4A to 4B, the pipe connection arrangement 10 comprises an additional elongated drive member 20' having a corresponding first end portion 21' comprising a corresponding outer profile 22'. The outer profile 22' is configured to mesh with the toothed outer profile 14 upon engagement with and subsequent rotation of the additional elongated drive member 20'. The corresponding first end portion 21' is configured to at least partly encompass a corresponding outer end part 31' of the additional supplementary guide member 30'. The corresponding first end portion 21' may further have a corresponding recess, as the recess 23, which is configured to at least partly encompass an outer end part 31' of the additional supplementary guide member 30'.

FIGS. 5A and 5B schematically illustrate a sequence of connecting the pipe 12 to the fluid management system 8 by means of the pipe connection arrangement 10 in FIGS. 3A to 3C and FIGS. 4A to 4B.

In FIG. 5A, the pipe connection arrangement 10 and the pipe 12 are illustrated in a state in which the pipe 12 is disconnected, and/or detached, from the connection point portion 4 of the fluid management system 8. In FIG. 5B, the pipe connection arrangement 10 and the pipe 12 are illustrated in a state in which the pipe 12 is connected and clamped to the connection point portion 4 of the fluid management system 8, thereby forming a liquid-tight configuration for the fluid. By the pipe connection arrangement 10, the pipe 12 is securely connected to the fluid management system 8 so that fluid can be transported through the pipe 12 to the injector 8*a*.

More specifically, in a first assembly state of the pipe 12 to the fluid management system 8, as shown in FIG. 5A and indicated by reference numeral 110, the pipe 12 with the pipe nut 11 is inserted into the connection point portion 4 of the fluid management system 8. The pipe 12 with the pipe nut 11 is inserted into the connection point portion 4 of the fluid management system 8 along the vertical direction Z, generally corresponding to the axial direction A of the pipe nut 11 and the pipe 12.

The pipe nut 11 with the pipe 12 is inserted into a hole of the fluid management system 8, defining the connection point portion 4, until the end portion 9 is at least partly positioned within the fluid management system 8.

Subsequently, in a second assembly state, as indicated by reference numeral 120, each one of the elongated drive members 20 and 20', are moved in the axial direction A, generally corresponding to the vertical direction Z, towards the corresponding supplementary guide members 30, 30'. As mentioned above, when the recess 23 of the first end portion 21 at least partly encircles or accommodate the outer end part 31 of the supplementary guide member 30, the elongated drive member 20 is arranged in engagement with the supplementary guide member 30. Analogously, when the corresponding recess of the corresponding first end portion 21' at least partly encircles or accommodates the corresponding outer end part 31' of the additional (second) supplementary guide member 30', the additional elongated drive member 20' is arranged in engagement with the additional (second) supplementary guide member 30'. In this state, the respective elongated drive members 20, 20' are arranged to be rotatable about corresponding outer end parts 31, 31'.

Moreover, due to the relative arrangement of the supplementary guide member 30, the elongated drive member 20 and the pipe nut 11 (which is in engagement with the connection point portion 4), the toothed outer profile 22 and the toothed outer profile 14 of the pipe nut 11 are arranged to mesh with each other. Analogously, due to the relative arrangement of the additional supplementary guide member 30', the additional elongated drive member 20' and the pipe nut 11 (which is in engagement with the connection point portion 4), the toothed outer profile 22' and the toothed outer profile 14 of the pipe nut 11 are arranged to mesh with each other from another side of the pipe nut 11.

Accordingly, in the second assembly state 120, the pipe nut 11 is in the threaded engagement with the thread of the connection point portion 4, wherein the toothed outer profile 14 of the pipe nut 11 and the toothed outer profile 22 of the elongated drive member 20 mesh together such that a rotation of the elongated drive member 20 results in a corresponding rotation of the pipe nut 11 for clamping the end portion 9 of the pipe 12 to, or un-clamping it from, the fluid port 2. The rotations of the respective elongated drive members 20, 20' are schematically illustrated in FIG. 5B, and corresponds to a third, and final, assembly state 130. As such, during a subsequent rotation of the elongated drive member 20 in its circumferential direction, and when the elongated drive member 20 is engaged with the supplementary guide member 30, the toothed outer profile 22 of the elongated drive member 20 engages and meshes with the outer profile 14 of the pipe nut 11 so as to effect a tightening of the pipe 12 relative to the pipe connection point portion 4 upon a rotation in a first circumferential direction, e.g. in a clockwise direction, or a loosening of the pipe 12 relative to the pipe connection point portion 4 upon a rotation in a second and opposite circumferential direction, e.g. in a counter-clockwise direction.

As may be gleaned from e.g. FIG. 5B, but also illustrated in the other Figures. e.g. FIGS. 3A to 3C, the extensions of the components of the pipe connection arrangement 10 in the axial direction A generally coincide with the vertical extension Z of the fluid management system 8 when the pipe 12 is inserted and connected to the connection point portion 4 of the fluid management system 8. Thus, as depicted in FIG. 5B, the components of the pipe connection arrangement and the end part 9 of the pipe 12 are essentially oriented in parallel with the vertical direction Z of the fluid management system 8.

It should also be readily appreciated that the elongated drive members 20, 20' are only parts of the pipe connection arrangement 10 during installation and removal of the pipe 12 to the connection point portion 4 of the fluid management system.

Moreover, it should be readily appreciated that when the pipe end 9 is loosened, it may remain in almost the same position as if it were tightened, i.e. about the pipe 12 as illustrated in e.g. FIG. 4A.

As mentioned above, it should be readily appreciated that the pipe connection arrangement 10 can be provided using merely one elongated drive member 20 and one supplementary guide member 30. Equally, the pipe connection arrangement 10 can be provided by applying one elongated drive member 20 over two supplementary guide members 30, 30' in an alternating manner. Upon finalizing the connection and tightening up of the pipe nut 11, the elongated drive member tool is removed until pipe disconnection or re-tightening is needed at a later time. Hence, the example with two elongated drive members 20, 20' and two supplementary guide members 30, 30' are merely an example for illustrating the functionality of the pipe connection arrangement 10.

To sum up, there is provided a pipe connection arrangement 10 for the fluid management system 8. The pipe connection arrangement 10 comprises the pipe nut 11 for releasably connecting the end portion 9 of the pipe 12 to the fluid port 2 of the fluid management system 8. The pipe nut comprises the first portion 13 having the toothed outer profile 14 and the second portion 15 configured to engage with the connection point portion 4 of the fluid management system 8. The pipe connection arrangement 10 also comprises the elongated drive member 20 having the first end portion 21 with the toothed outer profile 22. The toothed outer profile 22 is configured to cooperate with the toothed outer profile 14 of the pipe nut 11. The first end portion 21 is further configured to concentrically engage with the supplementary guide member 30, which is adapted to be fixedly arranged adjacent the connection point port 4 of the fluid management system 8. Also, when the elongated drive member 20 is in engagement with the supplementary guide member 30, and the second portion 15 of the pipe nut 11 is in engagement with the connection point portion 4, the toothed outer profile 22 and the toothed outer profile 14 of the pipe nut 11 are permitted to mesh together such that a rotation of the elongated drive member 20 causes a corresponding rotation of the pipe nut 11 so as to either clamp the end portion 9 to the fluid port 2 or unclamping the end portion from the fluid port 2.

In addition, the present disclosure relates to the fluid management system 8 comprising the pipe connection arrangement 10 according to any one of the examples described and illustrated herein.

Further, the present disclosure relates to the vehicle 1 comprising any one of the pipe connection arrangements 10 and/or the fluid management system 8 according to any one of examples described and illustrated herein.

The pipe connection arrangement 10 is here made of steel, such as stainless steel, or any other suitable metallic material. However, the pipe connection arrangement 10 may be made of a lightweight material, such as a plastic material, lightweight steel, aluminium or similar material.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "transversal" or "vertical" may be used herein to describe a relationship of one element to another element as illustrated in the Figures. It will be understood that these terms and those discussed above are intended to encompass different orientations of the system in addition to the orientation depicted in the Figures. Hence, it should be noted that the terms top and bottom, upper and lower, as well as any other similar terms are used in reference to the position of the fluid management system 8 as depicted in the drawings, e.g. FIGS. 3A to 5B, and the system may be positioned and used in other orientations.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Also, it should be readily appreciated that although some components are mentioned and/or illustrated as having certain dimensions and shapes, the dimensions and shapes of these components may likewise be provided in other shapes and dimensions, such as components having cross sections resembling circular-, oval-, rectangular- and triangular-shaped cross sections, or any other conceivable cross-section, as long as nothing else is mentioned in relation to these components and the components can provide their functions.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A pipe connection arrangement for a fluid management system, said pipe connection arrangement comprising:
a pipe nut for releasably connecting an end portion of a pipe to a fluid port of the fluid management system, said pipe nut comprising a first portion having a toothed outer profile and a second portion configured to engage with a connection point portion of said fluid management system,
an elongated drive member having a first end portion with a toothed outer profile being configured to cooperate with the toothed outer profile of the pipe nut, said first end portion further being configured to concentrically engage with a supplementary guide member adapted to be fixedly arranged adjacent the connection point portion of said fluid management system, whereby, when the elongated drive member is in engagement with the supplementary guide member, and the second portion of the pipe nut is in engagement with the connection point portion, the toothed outer profile of the elongated drive member and the toothed outer profile of the pipe nut are permitted to mesh together such that a rotation of said elongated drive member causes a corresponding rotation of the pipe nut for clamping the end portion to the fluid port or unclamping the end portion from the fluid port, wherein said first end portion comprises a recess arranged concentrically about a centre axis of the elongated drive member and further adapted to at least partly encompass an outer end part of the supplementary guide member,
wherein, when said first end portion of the elongated drive member is engaged with the supplementary guide member, said elongated drive member being arranged adjacent the pipe nut, and corresponding centre axis of said elongated drive member and said pipe nut, respectively, being arranged parallel to each other.

2. Pipe connection arrangement according to claim 1, wherein said pipe connection arrangement further comprises the supplementary guide member, said supplementary guide member being positioned at a distance from the connection point portion such that an axis of rotation of the pipe nut, when in engagement with the connection point portion, is essentially parallel to a centre axis of the supplementary guide member.

3. Pipe connection arrangement according to claim 1, further comprising an additional supplementary guide member, said additional supplementary guide member being positioned at an essentially same transverse distance from the connection point portion as the supplementary guide member, but at different angular location around a circumference of the connection point portion relative to the angular location of the supplementary guide member.

4. Pipe connection arrangement according to claim 3, wherein the additional supplementary guide member is positioned at an angular location that is not a multiple of 360 degrees divided by the number of teeth of the toothed outer profile.

5. Pipe connection arrangement according to claim 3, wherein the additional supplementary guide member is positioned at an angle being greater than 120 degrees relative to the supplementary guide member.

6. Pipe connection arrangement according to claim 3, wherein said pipe connection arrangement comprises an additional elongated drive member having a corresponding first end portion comprising a corresponding outer profile configured to mesh with the toothed outer profile upon engagement with and subsequent rotation of the additional elongated drive member, said corresponding first end portion being configured to at least partly encompass a corresponding outer end part of the additional supplementary guide member.

7. Pipe connection arrangement according to claim 1, wherein the second portion is either an outer threaded profile or an inner threaded profile of the pipe nut.

8. Pipe connection arrangement according to claim 1, wherein the toothed outer profile of the elongated drive member defines a six-point star-shaped pattern.

9. A fluid management system comprising a pipe connection arrangement according to claim 1.

10. Fluid management system according to claim 9, wherein the supplementary guide member is a separate part attached to the fluid management system.

11. Fluid management system according to claim 9, wherein the supplementary guide member is comprised with the fluid management system, and provided in the form of a cylindrical projecting segment or a cylindrical recessed segment with an inner diameter.

12. Fluid management system according to claim 9, said fluid management system comprising a fuel injector assembly for an internal combustion engine.

13. Fluid management system according to claim 12, wherein the fluid management system comprises a housing for accommodating an injector of the fuel injector assembly, the pipe connection arrangement being configured to connect the pipe to the connection point portion, whereby a fluid port of the injector is arranged in fluid communication with the connection point portion.

14. A vehicle comprising any one of a pipe connection arrangement according to claim 1.

15. A fluid management system, comprising:
a pipe connection arrangement comprising:
a pipe nut for releasably connecting an end portion of a pipe to a fluid port of the fluid management system, said pipe nut comprising a first portion having a toothed outer profile and a second portion configured to engage with a connection point portion of said fluid management system,
an elongated drive member having a first end portion with a toothed outer profile being configured to cooperate with the toothed outer profile of the pipe nut, said first end portion further being configured to concentrically engage with a supplementary guide member adapted to be fixedly arranged adjacent the connection point portion of said fluid management system, whereby, when the elongated drive member is in engagement with the supplementary guide member, and the second portion of the pipe nut is in engagement with the connection point portion, the toothed outer profile of the elongated drive member and the toothed outer profile of the pipe nut are permitted to mesh together such that a rotation of said elongated drive member causes a corresponding rotation of the pipe nut for clamping the end portion to the fluid port or unclamping the end portion from the fluid port,
wherein said first end portion comprises a recess arranged concentrically about a center axis of the elongated drive member and further adapted to at least partly encompass an outer end part of the supplementary guide member;
wherein the fluid management system comprises a fuel injector assembly for an internal combustion engine.

16. The fluid management system according to claim 15, wherein the fluid management system comprises a housing for accommodating an injector of the fuel injector assembly, the pipe connection arrangement being configured to connect the pipe to the connection point portion, whereby the fluid port of the injector is arranged in fluid communication with the connection point portion.

* * * * *